W. T. HOLT.
VEHICLE WHEEL.
APPLICATION FILED JUNE 7, 1915.
1,192,311.
Patented July 25, 1916.
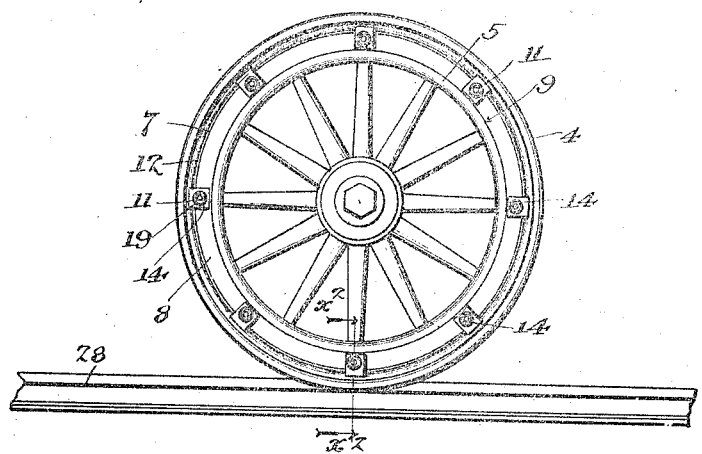
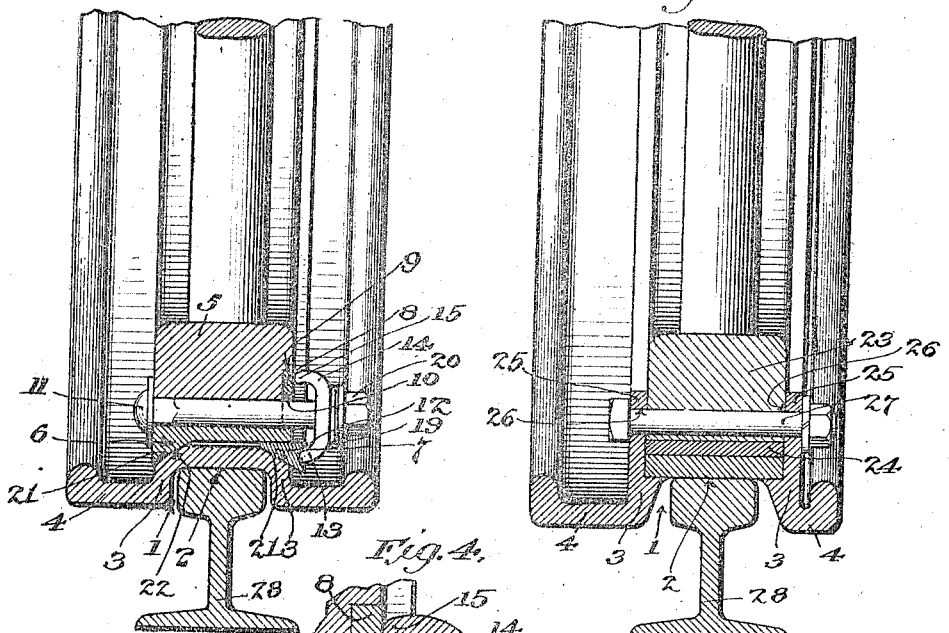
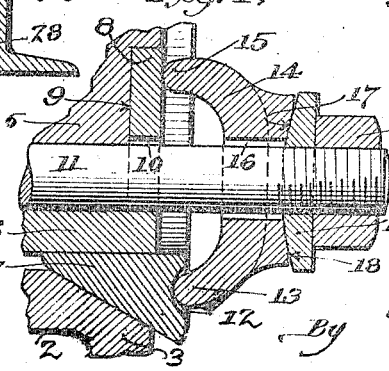
Witnesses:
Luto A. Alter
Sully Russo
Inventor:
William T. Holt,
By Frederick B. Ryan
Attorney

UNITED STATES PATENT OFFICE.

WILLIAM F. HOLT, OF REDLANDS, CALIFORNIA.

VEHICLE-WHEEL.

1,192,311. Specification of Letters Patent. Patented July 25, 1916.

Application filed June 7, 1915. Serial No. 32,495.

*To all whom it may concern:*

Be it known that I, WILLIAM F. HOLT, a citizen of the United States, residing at Redlands, in the county of San Bernardino and State of California, have invented a new and useful Vehicle-Wheel, of which the following is a specification.

This invention relates in general to convertible vehicle wheels, and broadly stated, an object of the invention is to make provision for suiting the vehicle wheels to railroad traction and street or highway traction so that the vehicle may be run from a railroad track to any desired point like any ordinary automobile or truck for loading and unloading freight and passengers, and so that the vehicle may be run on the railroad track like any ordinary steam or street railroad car for movement between points not provided with interconnecting highways or streets.

More specifically, an object of this invention is to effect the foregoing without it being necessary to have recourse to a change of wheels or to alterations of any part or parts of the wheels.

Another object is to so construct the vehicle wheels that said wheels may be run directly from the rails to the street and vice versa, without loss of traction.

Another object is to effect the foregoing by construction that is essentially simple and efficient.

Other objects and advantages may appear as the invention is unfolded in the subjoined detail description.

The accompanying drawings illustrate several embodiments of the invention.

Figure 1 is a side elevation of a wheel embodying the invention, and mounted on a track or rail, a fragment of which is shown. Fig. 2 is an enlarged fragmental view partly in section on line indicated by $x^2$—$x^2$, Fig. 1. Fig. 3 is a view analogous to Fig. 2 showing a modification of the invention. Fig. 4 is an enlarged detail of some of the parts shown in Figs. 1 and 2.

Primarily the wheel comprises treads of different diameters extending side by side around the periphery of the wheel formed by a grooved rim which may be formed by a single member, see Fig. 2, or formed in several members, see Fig. 3, the bottom of the groove 1 forming a rail engaging tread 2 provided at its sides with radially extending flanges 3, which are provided at their outer edges with laterally extending flanges 4 that may be the same width as one another as in Fig. 2, or of different widths, as in Fig. 3, said laterally extending flanges forming the street engaging tread of the wheel and said radially extending flanges preventing the wheel from slipping off the rail upon which it is running.

Referring now more particularly to Figs. 1, 2 and 4, the felly 5 of the wheel is provided at its periphery with a steel binding ring formed of two sections, a fixed section 6 and a removable section 7. The fixed section 6 is provided at one edge with an inwardly extending annular flange 8 seated in an annular recess 9 of the felly and provided with orifices 10 to receive through bolts 11 passing through the felly and projecting beyond the outer face of the flange 8, the removable section 7 being provided with notches or recesses 12 to receive the teeth 13 of U-shaped retainers 14, each of said retainers having the end opposite the tooth extended inward beyond the plane of said tooth to form a finger 15 engaging the flange 8, and said U-shaped retainers each being provided with an orifice 16 through which the bolt 11 extends. The outer end of each retainer 14 is provided with a curved socket 17 to seat the correspondingly curved face 18 of a washer 19, against which the nut 20 of the bolt is tightened to firmly hold the retainers against the flange 8 and section 7 so as to hold the sections 6 and 7 in place. The sections 6, 7 have peripheral beveled faces 21 fitting the complementary beveled faces 22 of the rim, so that tightening of the nut 20 will also cause the fastening ring sections to wedgedly grip the rim to firmly hold the rim in position.

In Fig. 3 the felly 23 is provided on its periphery with an under band 24 shrunk onto said felly, the rim in this form being in three sections, the radially extending flanges 3 and laterally extending flanges 4 forming the side sections and the rail engaging tread 2 forming the intermediate section, said rail engaging tread being shrunk onto the under band 24. The rim is provided with inwardly extending annular flanges 25 embracing between them the felly 23, said annular flanges being provided with orifices 26 to receive the bolt 27 passing through the felly.

In practical operation, it is clear that a vehicle equipped with a set of wheels constructed as above set forth is adapted to run along rails such as that indicated at 28 and that the tread 2 will ride on the ball of the rail and the flanges 3 will prevent the wheel from slipping off of the rail, and it is clear that the wheels may be run off of the ends of the rails or deflected from said rails by suitable switches, not shown, so as to permit the treads 4 to come into contact with the surface of the roadway or street. It is also clear that the foregoing is accomplished without it being necessary to make any alterations or adjustments to the parts of the wheel, thus saving the time that would be necessary in changing the tread of the wheel as is necessary in devices of the kind heretofore invented. It is, of course, understood that either or both of the flanges 4 may be provided with a suitable tire or tires constructed of rubber or other material fastened in place on the flange or flanges by any of the means well known in the art, and therefore not necessary to describe and illustrate herein.

The foregoing will enable those skilled in the art to make and use the device.

What I claim is:

A vehicle wheel comprising a felly having an annular recess, a rim, a binding ring around the periphery of the felly composed of a fixed section and a removable section, said removable section being wedgedly seated between the fixed section and rim, said fixed section being provided at one edge with an inwardly extending annular flange seated in the annular recess and provided with orifices, the removable section being provided with notches, retainers having teeth seated in said notches, each of said retainers having an orifice and having the end opposite the tooth extended inward beyond the plane of said tooth to form a finger engaging said annular flange, bolts passing through the retainers and through said annular flange and through the felly, the outer end of each retainer being provided with a curved socket, washers having curved faces seated in said curved sockets, and nuts on the bolts to hold the washers in place.

In testimony whereof, I have hereunto set my hand at Los Angeles, California, this 28th day of May, 1915.

WILLIAM F. HOLT.

In presence of—
GEORGE H. HILES,
LORO M. BOWERS.